United States Patent [19]

Angell et al.

[11] Patent Number: 5,189,516
[45] Date of Patent: Feb. 23, 1993

[54] VIDEO PREVIEW SYSTEM FOR ALLOWING MULTIPLE OUTPUTS TO BE VIEWED SIMULTANEOUSLY ON THE SAME MONITOR

[75] Inventors: Richard B. Angell, Nevada City; Kirk M. Gramcko, Grass Valley, both of Calif.

[73] Assignee: The Grass Valley Group, Inc., Nevada City, Calif.

[21] Appl. No.: 513,527

[22] Filed: Apr. 23, 1990

[51] Int. Cl.[5] .................. H04N 5/268; H04N 5/262
[52] U.S. Cl. .................................. 358/181; 358/183; 358/22; 358/185
[58] Field of Search ............... 358/181, 183, 185, 180, 358/22, 76, 160, 426, 182

[56] References Cited

U.S. PATENT DOCUMENTS

| | | | |
|---|---|---|---|
| 3,627,914 | 12/1971 | Davies | 178/5.8 |
| 4,040,098 | 8/1977 | Beeson et al. | 360/14 |
| 4,051,522 | 9/1977 | Healy | 358/181 |
| 4,205,346 | 5/1980 | Ross | 358/181 |
| 4,218,709 | 8/1980 | Baxter et al. | 358/181 |
| 4,266,242 | 5/1981 | McCoy | 358/183 |
| 4,507,683 | 3/1985 | Griesshaber et al. | 358/185 |
| 4,698,664 | 10/1987 | Nichols | 358/22 |
| 4,729,027 | 3/1988 | Hakamada et al. | 358/183 |
| 4,729,028 | 3/1988 | Micic | 358/183 |
| 4,758,892 | 7/1988 | Bloomfield | 358/183 |
| 4,857,994 | 8/1989 | Belmares-Sarabia | 358/22 |
| 4,970,588 | 11/1990 | Kobayashi | 358/183 |
| 4,994,916 | 2/1991 | Pshtissky | 358/181 |

FOREIGN PATENT DOCUMENTS 59-45787  3/1984  Japan .
2-217076  8/1990  Japan .

Primary Examiner—James J. Groody
Assistant Examiner—Sherrie Hsia
Attorney, Agent, or Firm—Francis I. Gray; John Smith-Hill

[57] ABSTRACT

A multiple video preview system for a production video switcher or digital effects device compresses a plurality of input video signals taken from various points along a video path through the switcher or effects device. The compressed input video signals are stored in a display memory in respective designated regions. The display memory is read out in a raster scan manner. The readout of a portion of the display memory occurs simultaneously with the storing of the compressed input video signals occurs in another portion of the display memory to provide a realtime video output signal that includes each input video signal in a compressed form. The video output signal is input to a monitor to display the input video signals simultaneously.

19 Claims, 3 Drawing Sheets

VIDEO PREVIEW SYSTEM FOR ALLOWING MULTIPLE OUTPUTS TO BE VIEWED SIMULTANEOUSLY ON THE SAME MONITOR

BACKGROUND OF THE INVENTION

The present invention relates to video viewing, and more particularly to a multiple video preview system for a video production switcher or video effects device for observing the video simultaneously at several points within the switcher or effects device.

Users of video production switchers often need to preview the result of a next transition that the switcher will make. It is particularly useful for setting up keys and other effects. This preview capability is built into most switchers. However users often also want to see the video "inside" the switcher at several different locations. For example in a switcher with multiple mix/effects sections and a downstream keyer they would like to view the clean output of each of the mix/effects sections, the preview or next transition output of each mix/effects section, and the downstream keyer. Live production particularly requires extensive preview capabilities. To provide several different preview outputs at the same time requires multiple preview circuits inside the switcher.

Previously viewing of multiple preview outputs also has required multiple output amplifiers in the switcher together with multiple cable connections to multiple video monitors. The monitors are expensive and bulky. Alternatively each preview output may be switched one by one to a single monitor, but for live production this is time consuming and impractical as decisions have to be made rapidly.

Therefore what is desired is a multiple video preview system that allows multiple preview outputs to be viewed simultaneously on a single monitor.

SUMMARY OF THE INVENTION

Accordingly the present invention provides a multiple preview system for displaying multiple video preview outputs simultaneously on a single monitor. Video input signals are compressed and stored in one portion of a display memory during the odd fields while stored compressed video data is being read out of another portion of the display memory, and vice versa, so that one memory portion contains the odd fields while the other portion contains the even fields. The video input signals are compressed, digitized and stored in respective designated regions of the memory. The addresses for the memory are generated by respective horizontal and vertical write and read counters so that the compressed video input signals are stored alternatingly pixel by pixel into the respective regions, while being read out in a raster scan format to provide a video output signal for a monitor that simultaneously displays all the video input signals in a compressed form.

The objects, advantages and other novel features of the present invention are apparent from the following detailed description when read in conjunction with the appended claims and attached drawing.

BRIEF DESCRIPTION OF THE DRAWING

The FIGS. 1A and 1B are block diagrams of a quad preview implementation of a multiple video preview system according to the present invention.

DESCRIPTION OF THE PREFERRED EMBODIMENT

Figure 1A:
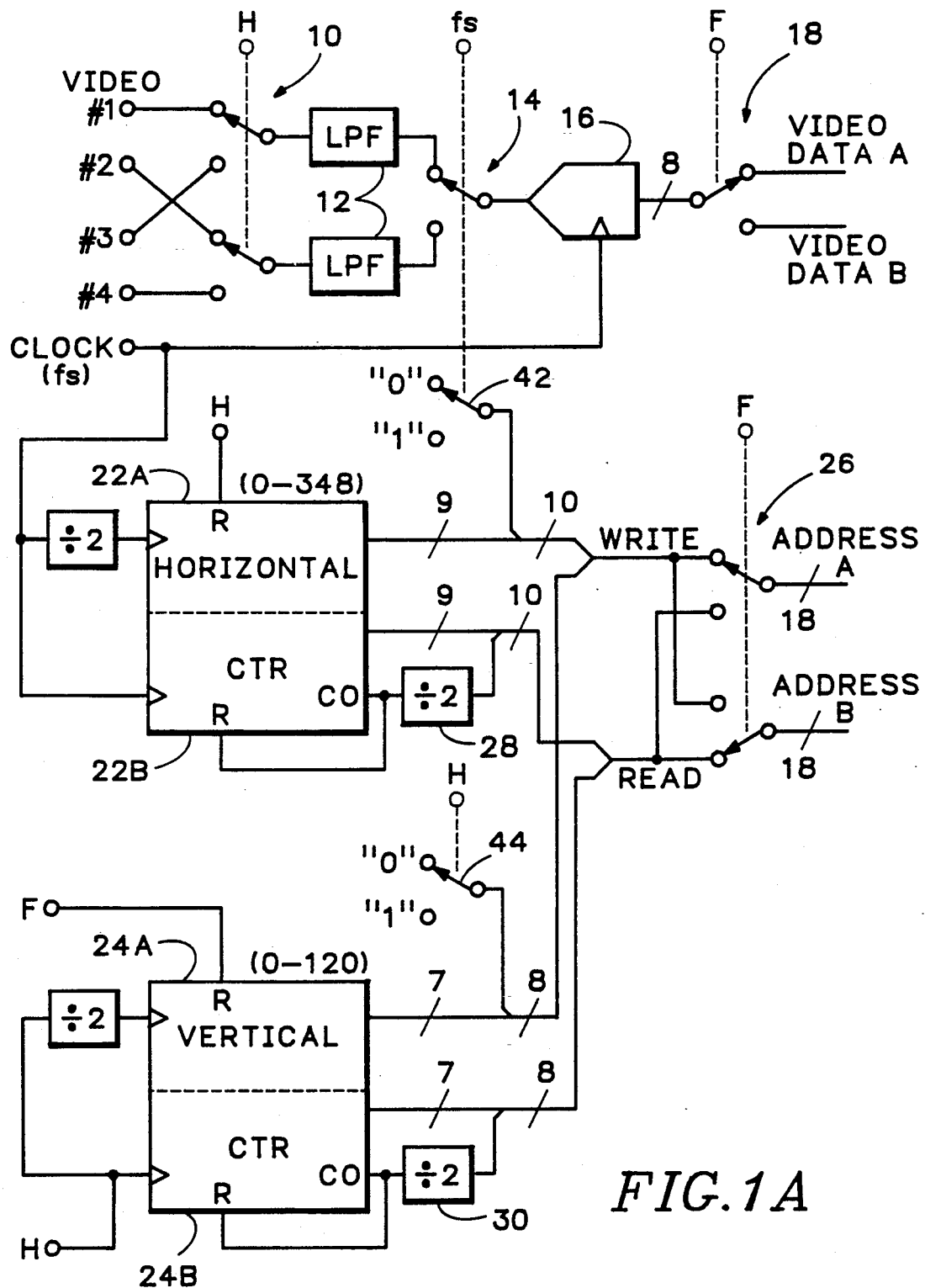
Figure 1B:
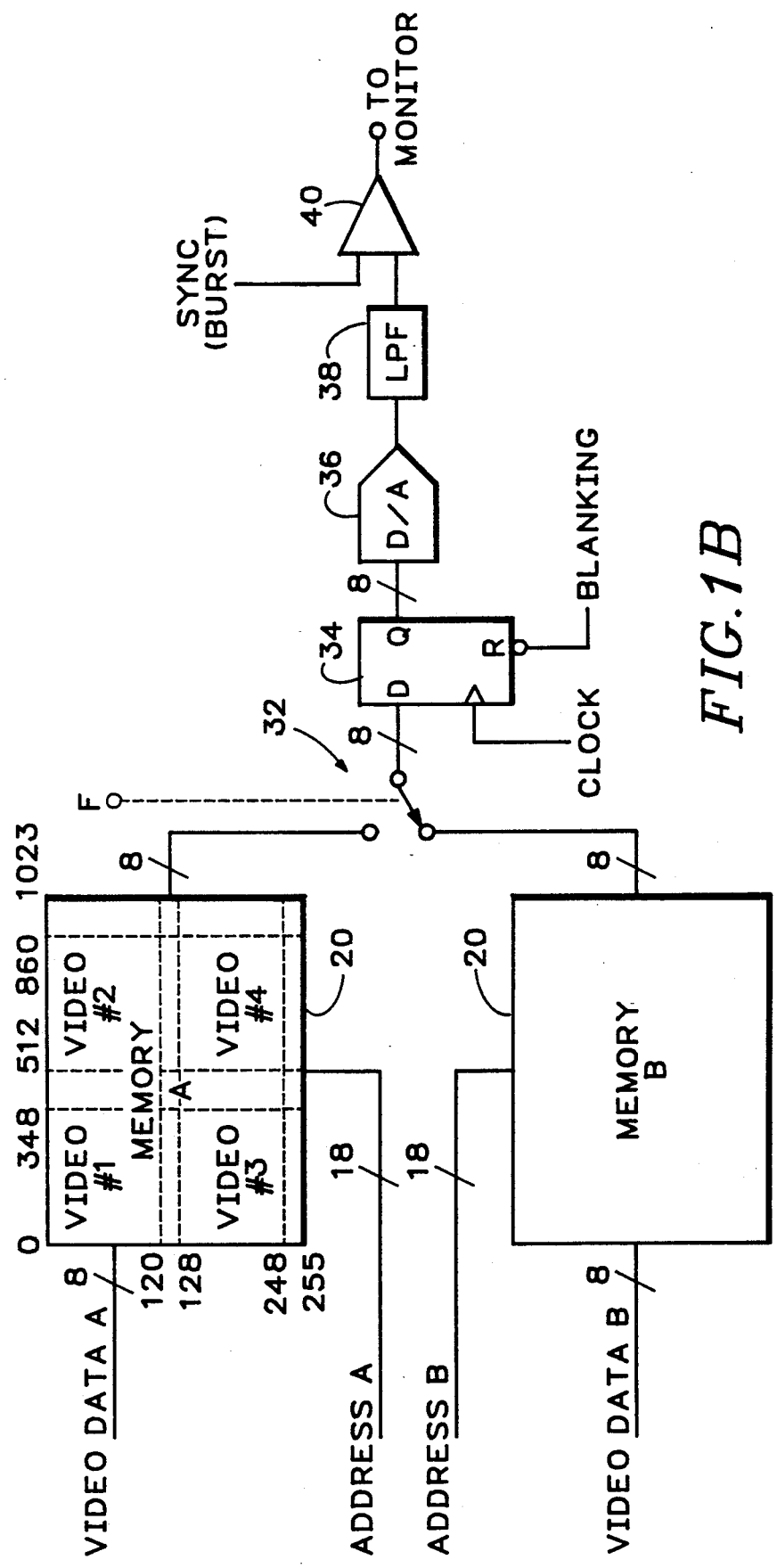
Figure 2:
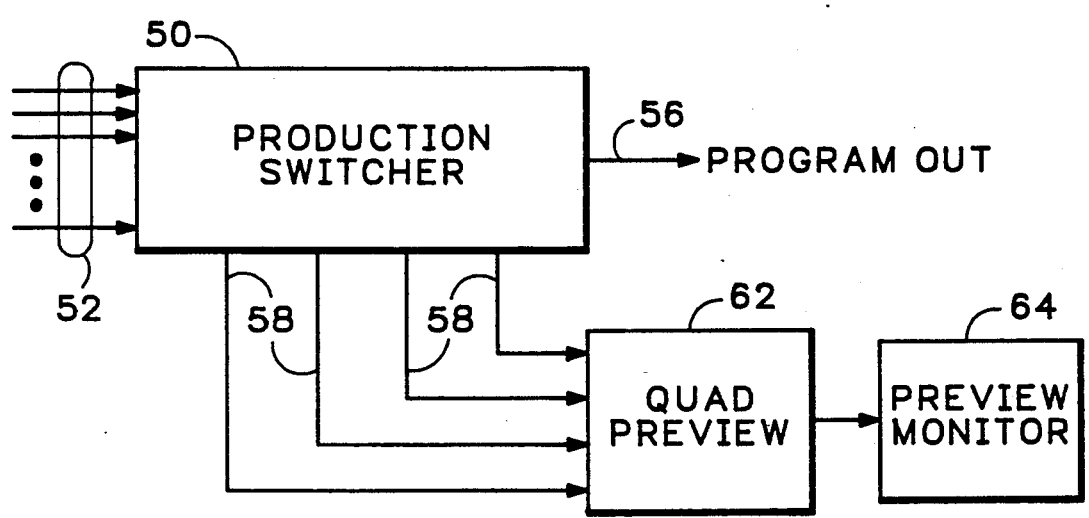
FIG. 2 is a block diagram illustrating a production switcher provided with a multiple video preview system according to the present invention.

Referring now to FIGS. 1A and 1B a video input switch 10 has four inputs and two outputs. The switch 10 is toggled at a horizontal-line frequency rate, H, so that first two input video signals, VIDEO #1 and VIDEO #2, are passed to the outputs and then the other two video signals, VIDEO #3 and VIDEO #4, are passed to the output. Each output of the switch 10 is input to a respective lowpass filter 12. The filtered output is then input to a sampling switch 14 having two inputs and a single output. The sampling switch 14 is toggled at a sampling frequency rate, fs, so that first a pixel from one video input signal, VIDEO #1 or video input signal, VIDEO #2 or VIDEO #4, to provide a data stream of pixels alternating between the two selected video input signals. An analog to digital (A/D) converter 16 digitizes each pixel in response to a sample clock signal, CLOCK. The digitized output from the A/D converter 16 is input to a data input switch 18 that toggles at a field frequency rate, F. The digitized data from the data input switch 18 is input to one of two memories 20 for storage at appropriate addresses. The two memories 20 may be different portions of a larger memory, as is well known in the art.

The sample clock signal, CLOCK, also increments a dual horizontal counter 22 that recycles from zero to N where N corresponds to one-half of the number of active video pixels per horizontal line in the video input signals. For generating horizontal write addresses a horizontal write counter portion 22A increments at one-half the sample clock signal frequency. A switch 42, which toggles between one and zero on alternate samples provides the most significant bit of the horizontal write address so that, for example, the horizontal write address sequence is 0, K, 1, K+1, 2, K+2, ..., N, K+N where K is a power of two corresponding to the most significant bit of the horizontal write address. In like manner a vertical write portion 24A of a dual vertical counter is clocked at a rate equal to one-half the horizontal line frequency for generating vertical write addresses, with the most significant bit of the vertical write address being provided by a switch 44 that toggles between zero and one at the horizontal line frequency rate, H, so that the vertical address sequence is 0, L, 1, L+1, ..., M, L+M where L is a power of two corresponding to the most significant bit of the vertical write address and M is the maximum count of the vertical counter 24 corresponding to one-half the active video horizontal lines of the video input signals. The horizontal and vertical write addresses are combined on a write address bus and input to an address switch 26 having four inputs and two outputs that is toggled at the field frequency rate, F. The write address bus forms two of the inputs to the address switch 26.

For generating read addresses the horizontal read counter portion 22B is clocked at the sample clock signal frequency, CLOCK, and the carryover output, CO, is input to a divide by two circuit 28 to generate the most significant bit for the horizontal read address. The carryover output, CO, also is fed back to the counter 22B to reset the counter. The read address sequence becomes 0, 1, 2, ..., N, K, K+1, ..., K+N. In like manner the vertical read addresses are generated by the vertical read counter portion 24B that is clocked at the horizontal line frequency, H, with a divide by two counter 30 coupled to the carryover output, CO, providing the most significant bit for the vertical read addresses, i.e., the vertical read address sequence is 0, 1, 2, ..., M, L, L+1, ..., L+M. The horizontal and vertical read addresses are combined onto a read address bus and input to the other two inputs of the address switch 26. The address switch 26 provides a write address to one memory portion 20 while providing a read address to the other memory portion, alternating between memory portions at the field frequency rate, F.

At the output of the memory portions 20 is an output switch 32 that selects for output at the field frequency rate, F, the memory portion currently being addressed by the read address bus via the address switch 26. The digital video data is input to a latch 34 that is clocked by the sample clock signal, CLOCK. The latched video data is converted to analog by a digital to analog (D/A) converter 36. The analog video is filtered by a lowpass filter 38 and input to an output amplifier 40 to which is added sync and burst signals, as appropriate, to provide an analog video signal. The analog video signal is input to a monitor (not shown) to present a quad preview display, i.e., a simultaneous display of the four video input signals, VIDEO #1, #2, #3, #4.

In operation four video signals, VIDEO #1, #2, #3, #4, are input to the input video switch 10, the video signals being typical interlaced raster scan signals. Starting with the first horizontal line, line 0, VIDEO #1 and #2 are selected and input via the lowpass filters 12 to the sample switch 14. During line 0 first a pixel value is taken from VIDEO #1 and then from VIDEO #2, alternating at the sample clock rate. The pixels are converted to digital and input over the data bus via data switch 18 to memory portion A. The output of the horizontal write address counter 22A is zero for the first pixel and 512 for the second pixel so that the first pixel from VIDEO #1 is loaded into memory portion A at line 0, pixel 0 and the first pixel from VIDEO #2 is loaded into memory portion A at pixel 512. The vertical write counter 24A provides a line 0 vertical address. After line 0 is completed, the input switch 10 provides VIDEO #3 and VIDEO #4 to the lowpass filters 12, which are then sampled in the same manner as for VIDEO #1 and #2. The vertical write counter 24A is still at line 0, but the most significant bit is now a one so that line 128 is selected in memory portion A. In this manner field 1 of each of the four video signals is compressed and written into designated regions of memory portion A as shown in FIG. 1B, with VIDEO #1 being represented by its odd lines and odd pixels, VIDEO #2 being represented by its odd lines and even pixels, VIDEO #3 being represented by its even lines and odd pixels, and VIDEO #4 being represented by its even lines and even pixels. At the next video field memory portion B is loaded in the same manner with field 2 of the video input signals.

For readout the memory 20 is scanned in a normal raster format, with the lines and pixels being output sequentially from left to right, top to bottom. The horizontal and vertical read counters 22B, 24B are incremented at pixel and horizontal line rates, respectively, with the carryover output, CO, causing the most significant bit of each read address, horizontal and vertical, to alternate between one and zero for each full count of the counters. The address switch 26 causes one of the memory portions 20 to be accessed for writing into while the other memory portion is being read out of. The resulting output is an interlaced video signal that presents the four video signals as a single video output signal for simultaneous display on a monitor.

Although observing only the luminance component may be sufficient for most applications, a full color system may be implemented by providing an identical channel for each color component, for a total of three parallel channels, and then combining the three outputs conventionally to produce a color video output signal for a color monitor. Also composite video may be used as the input video signals, with the subcarrier filtered out, and the output video signal is subsequently converted back to composite for display on the monitor. The specific embodiment described is a quad preview system, i.e., four video input signals are displayed on a single monitor simultaneously. However any number of video input signals may be so displayed by proper adjustment of the timing signals, as is readily apparent from the above description to one of ordinary skill in the art.

FIG. 1 illustrates in simplified block form a video production switcher 50 that receives multiple video input signals at input terminals 52 and combines selected video signals to provide an output signal at a program output terminal 56. The production switcher has four preview outputs 58 at which the video signals at various locations inside the switcher are provided. For example, if the switcher has multiple mix/effects sections and a downstream keyer, the preview outputs might be derived from the clean outputs of the various mix/effects sections and the preview or next transition output of each mix/effects section. The preview output terminals are connected to respective inputs of a quad preview system 62 of the form shown in FIGS. 1A and 1B. The output of the quad preview system 62 is applied to a preview monitor 64. Thus, the monitor 64 provides a display on a single screen of compressed versions of the four preview outputs of production switcher 50.

Thus the present invention provides a multiple video preview system that compresses multiple video signals and stores them in respective regions of two portions of a display memory, and then reads out the memory in a conventional raster scan manner to produce a single video output signal for display on a monitor that contains on a single display all of the input video signals simultaneously.

What is claimed is:
1. A multiple video preview system comprising:
   means for receiving a plurality of input video signals;
   means for selecting k of the input video signals at a time at a first rate;
   means for sequentially and repeatedly sampling each of the k input video signals at a second rate to produce a serial data stream in which each sequence of k consecutive data points contains one data point from each of the k input video signals;
   a memory;
   means for storing the serial data stream as compressed video for each input video signal in respective designated regions of the memory; and
   means for extracting the compressed video from the memory as a single video output signal for input to a monitor for simultaneously displaying the input video signals.
2. A system as recited in claim 1 wherein k is two, the first rate is a video horizontal line rate and the second rate is a video pixel sampling rate.

3. A system as recited in claim 1 comprising means for digitizing the serial data stream.

4. A system as recited in claim 1 wherein the storing means comprises means for generating write addresses for the memory, the write addresses routing the compressed video to the respective designated regions.

5. A multiple video preview system comprising:
means for compressing a plurality of input video signals into a serial data stream;
a memory;
means for storing the serial data stream as compressed video for each input video signal in respective designated regions of the memory, said storing means comprising means for generating write addresses for the memory, the write addresses routing the compressed video to the respective designated regions; and
means for extracting the compressed video from the memory as a single video output signal for input to a monitor for simultaneously displaying the input video signals,
and wherein the generating means comprises:
a horizontal write counter incremented at a third rate to provide base horizontal write addresses;
means for adding at a second rate n most significant bits to the base horizontal write addresses, where $2^n$ is greater or equal to k and k equals the number of input video signals to be displayed side-by-side horizontally;
a vertical write counter incremented at a fourth rate to provide base vertical write addresses;
means for adding at a first rate m most significant bits to the base vertical write addresses, where $2^m$ is greater or equal to l and l equals the number of input video signals to be displayed side-by-side vertically; and
means for combining the horizontal and vertical write addresses to produce the write addresses for the memory.

6. A system as recited in claim 5 wherein k and l each are two, n and m each are one, the first rate is a video horizontal line rate, the second rate is a video pixel sampling rate, the third rate is half the second rate and the fourth rate is half the first rate.

7. A system as recited in claim 5 wherein the storing means further comprises means for selecting at a fifth rate one of p portions of the memory into which the compressed video is to be stored.

8. A system as recited in claim 7 wherein p is two and the fifth rate is a video field rate.

9. A system as recited in claim 1 wherein the extracting means comprises means for generating read addresses for the memory, the read addresses extracting the compressed video in a raster scan format from the memory.

10. A multiple video preview system comprising:
means for compressing a plurality of input video signals into a serial data stream;
a memory;
means for storing the serial data stream as compressed video for each input video signal in respective designated regions of the memory; and
means for extracting the compressed video from the memory as a single video output signal for input to a monitor for simultaneously displaying the input video signals, said extracting means comprising means for generating read addresses for the memory, the read addresses extracting the compressed video in a raster scan format from the memory,
and wherein the generating means comprises:
a horizontal read counter incremented at a second rate to provide base horizontal read addresses;
means for adding at a sixth rate n most significant bits to the base horizontal read addresses, where $2^n$ is greater or equal to k and k equals the number of input video signals to be displayed side-by-side horizontally;
a vertical read counter incremented at a first rate to provide base vertical read addresses;
means for adding at a seventh rate m most significant bits to the base vertical read addresses, where $2^m$ is greater or equal to l and l equals the number of input video signals to be displayed side-by-side vertically; and
means for combining the horizontal and vertical read addressees to produce the read addresses for the memory.

11. A system as recited in claim 10 wherein m and n each are one, k and l each are two, the second rate is a video pixel sampling rate, the first rate is a video horizontal line rate, the sixth rate is half the first rate and the seventh rate is half a video field rate.

12. A system as recited in claim 10 wherein the extracting means further comprises means for selecting at a fifth rate one of p portions of the memory out of which the compressed video is to be read.

13. A system as recited in claim 12 wherein p is two and the fifth rate is a video field rate.

14. A video production switcher system comprising:
a video production switcher having a video path and a plurality of preview output terminals at which preview video signals derived from various points along the video path are provided;
means for compressing the preview video signals;
a display device; and
means for displaying the compressed preview video signals simultaneously on the display device.

15. A system as recited in claim 14 wherein the displaying means comprises:
a memory;
means for storing the compressed preview video signals in respective designated regions of the memory; and
means for extracting the compressed preview video signals from the memory as a single video output signal for input to the display device.

16. A system as recited in claim 14 wherein the compressing means compress the preview video signals into a serial data stream, and the displaying means comprises;
a memory;
means for storing the serial data stream as compressed video for each preview video signal in respective designated regions of the memory; and
means for extracting the compressed video from the memory as a single video output signal for input to the display device for simultaneously displaying the preview video signals.

17. A video production switcher system comprising:
a video production switcher having a video path and a plurality of preview output terminals at which preview video signals derived from various points along the video path are provided;
means for compressing the preview video signals into a serial data stream, the compressing means comprising means for selecting k of the preview video signals at a time at a first rate and means for sequentially and repeatedly sampling each of the k preview video signals at a second rate to produce the serial data stream in which each sequence of k consecutive points contains one data point from each of the k preview video signals;

a display device; and means for displaying the compressed preview video signals simultaneously on the display device, the displaying means comprising a memory, means for storing the serial data stream as compressed video for each preview video signal in respective designated regions of the memory, and means for extracting the compressed video from the memory as a single video output signal for input to the display device for simultaneously displaying the preview video signals.

18. A system as recited in claim 16 wherein the storing means comprises means for generating write addresses for the memory, the write addresses routing the compressed video to the respective designated regions.

19. A system as recited in claim 17 wherein the extracting means comprises means for generating read addresses for the memory, the read addresses extracting the compressed video in a raster scan format from the memory.

* * * * *